United States Patent [19]
Boyd

[11] Patent Number: 5,120,823
[45] Date of Patent: Jun. 9, 1992

[54] TOUGHENED THERMOSETTING STRUCTURAL MATERIALS

[75] Inventor: Jack D. Boyd, Westminster, Calif.

[73] Assignee: BASF Aktiengesellschaft, Ludwigshafen, Fed. Rep. of Germany

[21] Appl. No.: 679,866

[22] Filed: Apr. 3, 1991

Related U.S. Application Data

[62] Division of Ser. No. 312,526, Feb. 17, 1989, Pat. No. 5,037,689.

[51] Int. Cl.$^5$ .................. C08G 69/08; C08G 73/10
[52] U.S. Cl. .................. 528/310; 528/321; 528/322; 526/204; 526/205; 526/217; 526/218.1; 526/258; 526/259; 526/262; 428/473.5; 428/113; 428/240; 428/283; 525/426; 525/436
[58] Field of Search .......... 528/310, 321, 322; 428/113, 240, 283, 473.5; 525/426, 436; 526/204, 217, 218, 205, 258, 289, 262

[56] References Cited

U.S. PATENT DOCUMENTS

| | | | |
|---|---|---|---|
| 3,843,605 | 10/1974 | Schmidt et al. | 528/99 |
| 4,001,186 | 1/1977 | Onder | 528/73 |
| 4,100,140 | 7/1978 | Zahir et al. | 428/473.5 |
| 4,175,175 | 11/1979 | Johnson et al. | 528/125 |
| 4,546,131 | 10/1985 | Hefner et al. | 528/96 |
| 4,604,319 | 8/1986 | Evans et al. | 428/473.5 |
| 4,604,437 | 8/1986 | Renner | 528/322 |
| 4,608,404 | 8/1986 | Gardner et al. | 528/90 |
| 4,656,207 | 5/1987 | Jabloner et al. | 528/93 |
| 4,656,208 | 5/1987 | Chu et al. | 528/90 |
| 4,689,378 | 8/1987 | Chaudhari et al. | 528/322 |
| 4,957,801 | 9/1990 | Maranci et al. | 428/147 |

FOREIGN PATENT DOCUMENTS

| | | |
|---|---|---|
| 0252725 | 1/1988 | European Pat. Off. |
| 0274899 | 7/1988 | European Pat. Off. |
| WO90/09410 | 8/1990 | World Int. Prop. O. |

*Primary Examiner*—Morton Foelak
*Assistant Examiner*—P. Hampton-Hightower
*Attorney, Agent, or Firm*—William G. Conger

[57] ABSTRACT

Toughened bismaleimide resin systems capable of preparing carbon fiber reinforced composites having compression after impact strengths of greater than 40 Ksi are prepared from bismaleimide matrix resin systems containing a member of a limited set of soluble thermoplastic polyimides in particulate form.

6 Claims, No Drawings

TOUGHENED THERMOSETTING STRUCTURAL MATERIALS

This is a division of application Ser. No. 07/312,526, filed Feb. 17, 1989, now U.S. Pat. No. 5,037,689.

BACKGROUND OF THE INVENTION

1. Field of the Invention

The subject matter of the present invention concerns toughened, thermosetting structural materials. More particularly, the subject matter involves structural materials which exhibit superior toughness, or resistance to impact-induced damage. Such materials find uses in many applications, particularly the aerospace field, as matrix resins for fiber reinforced prepregs, the composites prepared therefrom, and as structural adhesives.

2. Description of the Related Art

Although many thermoplastics are tough, ductile materials, their use in structural materials has been minimal for several reasons. First, many of the thermoplastics do not have the required solvent resistance, thermal stability, and high softening points required in demanding aerospace applications. Second, the high temperature engineering thermoplastics are difficult to process, often requiring both high temperature and pressure to produce acceptable fiber reinforced parts.

For these reasons, and despite the proliferation and improvement of high temperature, high performance thermoplastics, thermosetting systems currently remain the important commercial resin systems. Of the thermosets available, by far the most common are the epoxies, the bismaleimides, and the cyanates. Each of these resin systems has its own unique set of physical and chemical attributes, but all are glassy, generally crosslinked systems which tend to be brittle. Thus attempts at toughening such systems have become increasingly important.

By the term toughness is meant resistance to impact induced damage. Toughness in cured neat resin samples may be assessed by the critical stress intensity factor, $K_{1C}$, among others. Toughness in fiber reinforced composites prepared by laying up and subsequently curing numerous plies of prepregs is best assessed by measuring the compression strength after an impact of suitable energy. Generally, an impact of 1000 or 1500 in-lb/in (respectively, 4.45 and 6.68 kJ/m) is used, and compression after impact (CAI) values measured in accordance with Boeing test BSS 7260 on a quasiisotropic [+45/0/−45/90]$_{4s}$ layup. Similar tests may be specified by other aerospace manufacturers.

Elastomers have been used with good success in toughening a number of thermosetting resins, particularly epoxy resins. Examples of such systems are given in Bauer, *Epoxy Resin Chemistry II*, Chapters 1–5, ACS Symposium Series 221, American Chemical Society, Washington, D.C., 1983. Both soluble and infusible elastomers have been utilized, the former generally increasing flexibility at the expense of physical properties such as tensile modulus, while the latter generally increase toughness without substantially affecting bulk properties. Both types of modification generally lead to lower thermal properties, an effect which can be minimized when polysiloxane elastomers are utilized.

Soluble thermoplastics have also been used, for example in the article by Bucknall and Partridge, "Phase Separation in Epoxy Resins Containing Polyethersulfone," *Polymer* 24 639–646 (1983). In Bucknall's examples, dissolution of up to 17 percent by weight of a polyethersulfone having a molecular weight slightly greater than 20,000 Daltons in an epoxy formulation increased toughness as measured by $K_{1C}$ by up to 50 percent. At the highest levels, phase separation was noted upon cure of the system, the resulting cured neat resin consisting of the glassy polyethersulfone discontinuous phase dispersed within a glassy epoxy continuous phase. With epoxy resins having an average functionality of four, no phase separation was observed, although the cured system still displayed enhanced toughness.

Dissolution of up to 80 weight percent of soluble polyimide PI2080 into the bismaleimide of bis[4-aminophenyl]methane wa disclosed by Yamamoto in "Preparation and Characterization of Thermo-Plastic/Thermo-Setting Polyimide Blends," published in SAMPE Journal, July/August 1985. However, resin systems containing high levels of dissolved polyimide are difficult to process and generally have little if any tack, an important consideration in the laying up of prepregs into composites. Furthermore, high levels of dissolved thermoplastic make fiber impregnation by the film method difficult.

Toughened systems have also been proposed which rely for toughness, on the use of oligomeric curing agents or monomers. Such monomers and curing agents have less crosslink density and thus are inherently more flexible, tougher systems. In U.S. Pat. No. 4,608,404, for example, epoxy resin systems containing an epoxy resin and an oligomeric amine-terminated polyethersulfone is disclosed. Such systems were capable of providing composites having CAI (compression after impact, see infra) values of greater than 30 Ksi, particularly when diaminodiphenylsulfone (DDS) was used as a co-curative.

In U.S. Pat. Nos. 4,656,207 and 4,656,208, the principles of Bucknall and Partridge and of the '404 patentees were logically combined to provide epoxy systems employing DDS and greater than 25 percent by weight of a reactive polyethersulfone oligomer having a molecular weight of from 2000 to 10,000 Daltons. These epoxy systems cure into two phase systems having a glassy discontinuous phase dispersed within a glassy continuous phase as disclosed by Bucknall but utilizing a lower molecular weight, and thus more soluble and less viscous, polyethersulfone oligomer. Carbon fiber reinforced composites employing the resin systems of the '207 and '208 patents are able to achieve CAI values in excess of 40 Ksi. Other researchers have utilized analogous technologies with bismaleimide resins.

In U.S. Pat. No. 4,604,319, discrete films of thermoplastic, optionally containing up to 40 percent by weight thermosetting resin, are applied under heat and pressure to epoxy or bismaleimide prepregs containing carbon fibers as reinforcement. When such film faced prepregs are laminated together to form a composite, CAI values greater than 40 Ksi can be obtained. Unfortunately, such prepregs have not been accepted by the industry due to the possibility of a mistake during layup wherein two thermoplastic films might abut each other, promoting catastrophic interlaminar separation. Furthermore, such prepregs have little tack, and thus make composite layup difficult.

In European patent EP-A-O 252 725, elastomeric interlayers are formed in situ by the filtering out of discrete, infusible particles by the fiber reinforcement because the particles are larger (10–75 μm) than the fiber interstices. Prepregs such as these and composites formed therefrom have the capability of having CAI values in the 40-50 Ksi range, but may suffer from lower properties at elevated temperatures.

In European patent EP-A-O 274 899, the addition of thermoplastics, preferably in the form of solid, spherical particles, to thermosettable resin systems is said to cause an increase in toughness. Examples of thermoplastics are polyamideimides, polybutyleneterephthalate, and nylon, with transparent nylons being preferred. When particles greater than 2 $\mu$m in diameter are utilized, the thermoplastic is concentrated in situ onto the outside of the prepreg as in EP-A-O 252 725. When particles having a size less than 2 $\mu$m are used, the thermoplastic remains homogenously dispersed within the prepreg.

SUMMARY OF THE INVENTION

It has now been found that the concept of toughening thermosetting resins by the addition of thermoplastics in particulate form is much too general, and that the addition of some thermoplastics even cause the toughness of the cured resin to be less than that of the unmodified resin. Thus as an initial consideration, it appears impossible to predict with any degree of accuracy, the behavior of broad classes of thermoplastics in a base resin system. However it has further been discovered that certain thermoplastics may be utilized to toughen specific resin systems effectively. These toughened resins may be used as structural adhesives but are most advantageously used as matrix resins in fiber reinforced heat curable prepregs.

DESCRIPTION OF THE PREFERRED EMBODIMENTS

The present invention concerns the addition of a select group of thermoplastic polyimides in solid form to bismaleimide resin systems in order to provide increased toughness, and, in particular, significant resistance to impact induced damage. The thermoplastic polyimides are added to the uncured bismaleimide resin preferably by means of a slurry mixing process by means of which a substantial amount of polyimide remains in a particulate form having a mean size between 2 and 30 $\mu$m in the neat uncured matrix resin. During the prepregging operation, a substantial amount of these polyimide particles are filtered out by the reinforcing fibers, forming a thermoplastic rich and/or thermoplastic particle-rich zone substantially exterior to the fibers. Following cure, the polyimide may remain as a largely continuous film in the interlayer zone or as a thermoplastic enriched, cured, bismaleimide layer.

The bismaleimide monomers useful in the subject invention are well known to those skilled in the art and in most cases are commercial products of ready availability. The bismaleimides are generally prepared by the reaction of an unsaturated anhydride with the primary amino groups of a di- or polyamine, and as used herein, the term bismaleimide includes minor amounts of maleimide-group-containing monomers of higher functionality, i.e. tris- and tetramaleimides. However, the preferred bismaleimides are difunctional. The term bismaleimide as used herein also includes the closely related nadic imides which are prepared in substantially the same manner as the bismaleimides but using an unsaturated anhydride such as the norborene dicarboxylic acid anhydrides formed from the Diels-Alder reaction of maleic anhydride or substituted maleic anhydrides with cyclopentadiene or substituted cyclopentadienes, particularly methylcyclopentadiene.

Suitable bismaleimides and methods for their preparation are disclosed, for example, in U.S. Pat. Nos. 4,604,437; 4,100,140; 4,130,564; 4,138,406; 4,154,737; 4,229,351; and 4,689,378 which are herein incorporated by reference in their entirety. Particularly preferred bismaleimides include the bismaleimides of the toluene diamines and 4,4'-methylenedianiline, and the commercially available eutectic bismaleimide mixtures. These latter mixtures, one of which is COMPIMIDE ® 353, a product of Shell Chemical Co., formerly available from Boots-Technochemie, are mixtures of two or more bismaleimides, the mixture of which has a lower melting point than the bismaleimides alone. COMPIMIDE ® 353, for example, contains the bismaleimides of 4,4'-diaminodiphenylmethane, toluene diamine, and 1,6-diamino-2,2,4-trimethylhexane.

The bismaleimide monomers described above are seldom used alone, but are most often used as a total resin system which may contain other polymerizable species in addition to fillers, rheology control agents, catalysts, fibrous and non-fibrous reinforcement, and the like. Particularly important in bismaleimide resin systems are various comonomers and reactive modifiers.

The comonomers may be interreactive in that they react with the bismaleimides, or they may only react with themselves or other system components. Some of these materials may perform more than one function. Epoxy resins, for example, are generally unreactive with maleimide groups, but may react with other system components, particularly amines, phenols, and anhydrides. In addition, liquid epoxy resins such as those based on bisphenol A or bisphenol F may serve as tackifiers, increasing the layup temperature tack of adhesives, matrix resins, and prepregs.

Among the comonomers useful with bismaleimides are the di- and polyamines and the alkenyl and alkenylphenols and phenoxyethers. Di- and polyamines useful, for example, include both aliphatic amines such as 1,6-diamino-2,2,4-trimethylhexane, 1,6-hexanediamine, 1,8-octanediamine, bis(3-aminopropyl)ether, and the like; and aromatic amines such as 1,2-, 1,3-, and 1,4-phenylenediamine, 2,4- and 2,6-toluenediamine, 2,2'-, 2,4'-, 3,3'-, and 4,4'-diaminodiphenylmethane, and diaminodiphenylmethane analogues in which the bridging methylene group is replaced by a divalent organic group such as —CO—, —COO—, —OCOO—, —SO—, —S—, —SO$_2$—, —NH—CO—, and the like. Prepolymers prepared from bismaleimides and the aforementioned amines are also useful.

Alkenyl group-containing compounds, particularly alkenyl aromatic compounds may also be suitable comonomers. Examples of these compounds are styrene, 1,4-divinylbenzene, terephthalic acid diacrylate, cyanuric acid triacrylate, and glyceryl triacrylate. The corresponding allyl, methallyl, methacrylo, and methylvinyl group-containing compounds are also suitable.

Among the alkenylphenols and alkenylphenoxy ethers useful are particularly the allyl, methallyl, and propenyl phenols such as o,o'-diallylbisphenol A, eugenol, eugenol methylether, and similar compounds as disclosed in U.S. Pat. No. 4,100,140. Also useful are oligomers which are terminated with allyl- or propenylphenyl or allyl- or propenylphenoxy groups such the appropriately terminated polysiloxanes, polyetherketones, polyethersulfones, polyimides, polyetherimides, and the like. Suitably terminated oligomers, for example, may be prepared by allylating phenolated dicyclopentadienes and subsequently rearranging t the allylphenol as taught in U.S. Pat. No. 4,546,129, which is incorporated herein by reference. Most preferably, the alkenylphenol is o,o'-diallylbisphenol A or o,o'-dipropenylbisphenol A. The alkenylphenols and alkenylphenoxy comonomers are utilized in amounts of up to 70 weight percent based on the total system weight, preferably from 10 to 50 percent, and most preferably from about 20 to about 40 percent; or from 5 to about 150 percent, preferably from 30 to about 100 percent based on the weight of the bismaleimide(s).

Also useful as comonomers are the cyanate ester resins and their reaction products with bismaleimides. The cyanate ester resins contain the —OCN reactive moiety and are generally prepared by the reaction of a cyanogen halide with a di- or polyphenol. Suitable cyanate ester resins and methods for their preparation are disclosed in U.S. Pat. No. 4,546,131, which is herein incorporated by reference. Prepolymers prepared by the reaction of the cyanate resins with epoxy resins or with bismaleimide resins are also useful. The latter are available commercially from the Mitschubishi Gas Chemical Co. as "BT Triazine Resins."

Epoxy resins may be useful in the resin systems of the subject invention as indicated earlier. Among such resins are those described in the treatise *Handbook of Epoxy Resins*, Lee and Neville, McGraw-Hill, ©1967; and *Epoxy Resins Chemistry and Technology*, May and Tanaka, Marcel Dekker, ©1973. Among the most useful epoxy resins because of their ability to aid the tack of bismaleimide formulations, are the liquid epoxies, particularly those derived from bisphenol A, bisphenol F, and p-aminophenol. Generally, minor quantities of epoxy resins are utilized, for example up to about 30 percent, more preferably up to 20 percent, and most preferably less than 10 percent by weight.

Toughening modifiers are also useful in the practice of the subject invention. Generally, these are reactive oligomers having molecular weights of between 600 and 30,000 Daltons. These modifiers may be terminated or have medial reactive groups such as the allyl or propenylphenols and phenoxy ethers discussed previously, or amino, maleimide, cyanate, isocyanurate, or other groups interreactive with bismaleimides. The backbone of these oligomers may be of diverse nature, for example polyarylene such as the polyetherketones, polyetheretherketones, polysulfones, polyethersulfones and the like as prepared in U.S. Pat. No. 4,175,175 and in the article *Toughening of Bis Maleimide Resins: Synthesis and Characterization of Maleimide Terminated Poly (Arylene Ether) Oligomers and Polymers*, J. E. McGrath, et. al., NASA report n187-27036, Final Report Task 1-17000. The backbone may also be derived from polysiloxanes or, in particular, poly(dicyclopentadienes) terminated with allyl or propenyl phenol or phenoxy groups.

The thermoplastic particles used to prepare the resin systems of the subject invention are limited to polyimide thermoplastics derived from a bis(anhydride) and two particular diamines, toluenediamine (TDA) and 4,4'-diaminodiphenylmethane (MDA). These polyimides may also contain minor quantities, i.e. up to about 20 percent by weight of other diamines, so long as the amount does not affect the ability of the thermoplastic to toughen the bismaleimide. Preferably, the polyimide contains TDA and MDA in a weight ratio of 20/80.

The dianhydride selected to prepare the thermoplastic polyimide may be selected from numerous dianhydrides. These dianhydrides are preferably dinuclear, i.e. the anhydride groups are located on different aromatic rings connected by a divalent linking group, or by a covalent bond. Examples of such dianhydrides are diphthalyl dianhydride, bis(phthalyl)methane dianhydride, bis(phthalyl)ketone dianhydride, bis(phthalyl)sulfide dianhydride, bis(phthalyl)sulfone dianhydride, and the like. Thus the preferred dianhydrides have the formula:

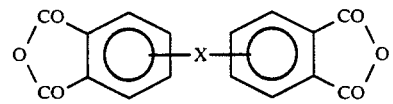

wherein X represents the organic linking group or a covalent bond. Minor quantities, i.e. not more than about 20 weight percent of the total dianhydride component may comprise a mononuclear dianhydride such as 1,2,4,5-benzenetetracarboxylic acid dianhydride. Preferably, the linking group is the carbonyl group. This dianhydride is more commonly called benzophenone tetracarboxylic acid dianhydride (BTDA).

In the foregoing description of the soluble polyimide thermoplastics useful in the subject invention, it has been assumed that the polyimide preparation will occur by polymerizing approximately equimolar quantities of a diamine and a dianhydride. However, there are also other means of preparing such polyimides. For example, suitable polyimides having substantially the same properties as those formed by the condensation polymerization of dianhydrides and diamines may be made by reacting a dianhydride with the diisocyanate corresponding to the diamine as taught by U.S. Pat. No. 4,001,186. In the specification and claims, the polyimide is identified as containing residues of BTDA and both TDA and MDA. This terminology also includes similar polyimides which formally contain such residues but which are produced in other ways, for example by the reaction of BTDA or benzophenone tetracarboxylic acid with mixtures of toluenediisocyanate and methylenediphenylenediisocyanate.

Most preferred as the thermoplastic is a polyimide available from Lenzing, A.G., A-4860 Lenzing, Austria as High Performance Powder P84. This polyimide was previously available from DOW as Polyimide P2080, and from Upjohn as PI2080. This polyimide is believed to be made in accordance with the teachings of U.S. Pat. No. 4,001,186 and may be considered as being derived from the residues of BTDA, TDA, and MDA, the latter two in a weight ratio of 80/20. The product may be further characterized by nominal physical properties as follows: a specific gravity of about 1.33; a heat deflection temperature [DIN 53461(A)] of 288° C.; a tensile strength (DIN 53455) of 110 MPa; and an elongation at break (DIN 53455) of 5 percent.

Whatever the composition of the thermoplastic, it must first be reduced to the appropriate particle size. The average particle size should be less than about 50 μm, preferably less than 30 μm, and most preferably in the range of 2-20 μm. An average particle size of 5-15 μm is particularly preferred. Particle size should be in mean diameter as measured on a Brinkman model 2010 particle size analyzer utilizing volume distribution. Such particle sizes may obtained by traditional means, for example cryogenic grinding, ball or sand milling, etc., but is most advantageously prepared by air jet milling. All such grinding techniques are well known to those skilled in the art. Other means of size reduction, for example spray drying or solution precipitation are also commonly practiced. These latter techniques may be useful, in particular solution precipitation, to produce thermoplastic particles of roughly spherical shape. Such particles have a minimum surface to volume ratio which may be helpful in reducing the viscosity of the overall resin system, particularly those having high thermoplastic loading.

The amount of thermoplastic useful in the subject invention is generally in excess of 10 weight percent. Amounts of thermoplastic up to about 60 weight percent may be useful, but in general, from 15 to about 45 weight percent, preferably from 20 to about 35 weight percent are used. Lower amounts of thermoplastic, i.e. from 5 to 10 percent by weight may prove successful when used in conjunction with another thermoplastic which is dissolved in the other resin system components. This dissolved thermoplastic may be of a similar type, for example a different, soluble polyimide (e.g. Matrimide ® 5218), or may be a different type of polymer, for example a reactive or non-reactive polysulfone, polyethersulfone, polyetherketone, or the like. The molecular weight of this additional, soluble thermoplastic may be from about 2000 to about 150,000 Daltons, but is preferably from 20,000 to about 100,000 Daltons. The soluble thermoplastic may be used in amounts from 1 to about 15 percent, preferably 5 to about 15 percent by weight.

In addition to the primary tougheners such as the toughening modifiers cited earlier, and the secondary tougheners such as the thermoplastic particle tougheners and dissolved thermoplastics, elastomeric particle tougheners may be useful as tertiary tougheners. Such elastomers are well known to those skilled in the art and include, for example, the various ATBN and CTBN elastomers available from the B. F. Goodrich Company, as the HYCAR ® rubbers, and various polysiloxane elastomers, particularly the reactive polysiloxanes such as the aminopropyl terminated polymethyl and polyphenyl polysiloxanes. Such tertiary elastomeric particle tougheners may have particle sizes from 0.01 to 100 μm, preferably from 1.0 to 75 μm, and more preferably from 10 to 50 μm.

Catalysts may also be useful in the resin systems of the subject invention. Such catalysts are well known to those skilled in the art, for example tertiary amines; metal carboxylates, e.g. tin(II) octoate; and particularly the organophosphines, organophosphine salts, complexes, and the reaction products of maleimide group-containing compounds and organophosphines such as those disclosed as useful for epoxy resin systems in U.S. Pat. No. 3,843,605.

The resin systems of the subject invention are generally prepared by mixing together the various system components, with the exception of the thermoplastic particle secondary toughener(s) and any elastomer particle tertiary toughener(s), and any catalyst, until the resulting mixture is substantially homogeneous. In a particularly preferred method of preparation, a substantial quantity of bismaleimide and alkenylphenol primary toughener, for example o,o'-diallylbisphenol A, are melted together to form a homogeneous solution whereupon additional bismaleimide is added in the form of particles having a size of from 0.5 to about 10 μm. in such a manner that substantially all the added bismaleimide remains in solid form. Such "slurry mixed" systems have appreciably better tack than otherwise similar systems prepared conventionally by melt solutioning the components.

Following the preparation of the uniform mixture previously described, the thermoplastic particles, particulate elastomers, and catalyst(s) are added at as low a temperature as possible. A substantial amount, i.e. more than 30 percent, preferably more than 70 percent of particulate thermoplastic should remain in particulate form in the resin system.

The resin systems, prepared as described, may be cast as a thin film for use as an adhesive or, preferably, for use as a prepregging matrix resin. When used as a prepregging resin, the dual film technique is preferably used. In this technique, the fiber reinforcement, generally high strength fibers of polyalkylene, polyamide, polyarylamide, glass, quartz, or especially carbon and graphitic fibers which are generally termed merely "carbon fibers", is sandwiched between two films of the prepregging resin and heat and pressure applied so as to force the matrix resin into the spaces between the fibers. This technique, as well as the closely related single film technique, is well known to those skilled in the art, and is disclosed, for example, in U.S. Pat. No. 3,784,433 which is herein incorporated by reference. The resin content of the prepreg may be adjusted by varying the thickness, and hence the areal weight of the resin films. The resin content is generally between 20 and 60 percent by weight, more preferably between 30 and 40 percent by weight.

In addition to single and dual filming, hybrid prepreg preparation methods such as combinations of solution impregnation and film impregnation are useful. For example, a bismaleimide resin system not containing the particulate thermoplastics of the subject invention may be used to partially impregnate the fiber reinforcement by passing the fibers (cloth, tows, mat, etc.) through a solution of the resin system in a suitable solvent, e.g. acetone, methylethylketone, dimethylformamide, N-methylpyrrolidone, methylene chloride, and the like, following which the solvent is evaporated. The resin content of the prepreg is less than the final level desired, and the remainder of the system, this portion containing thermoplastic particles is applied by single or preferably by dual filming. In this method, the interior resin composition and exterior resin compositions may be changed or varied. The same effect may also be obtained by dual filming with two subsequently applied films, or four films altogether.

By whichever method the prepreg is prepared, the net result is a prepreg having a thermoplastic rich or thermoplastic particle rich layer which is contiguous with but substantially exterior to the fiber reinforcement and its surrounding resin. Upon cure, the thermoplastic particles are believed to swell and/or dissolve, producing a cured resin having a thermoplastic concentration gradient which is greatest at or near what would be the surface of the prepreg.

When such prepregs are layed up into composite structures and cured, the thermoplastic enriched area lies in the interply zone substantially medially between the fiber reinforcement layers. The composites prepared by this method may contain thermoplastic in the form of a continuous or quasi-continuous layer between the plies, this layer containing both thermoplastic and thermosetting resin components.

The following examples serve to illustrate the compositions and products of the subject invention. All parts in the examples are parts by weight.

EXAMPLE 1

A bismaleimide resin system was prepared by dissolving 48 parts of a eutectic mixture of bismaleimides, Compimide® 353A, into 32 parts of o,o'-diallylbisphenol A at 120° C. When a homogenous mixture was obtained, 20 parts Lenzing P84 thermoplastic polyimide which had been jet milled to an average particle size of approximately 8 μm (90%<10 μm) was added at 90° C., and incorporated by high shear mixing. The product was coated onto release paper and later used to prepare a carbon fiber reinforced prepreg. The resin system, less the thermoplastic, is denominated in Table II (infra) as resin system A.

EXAMPLE 2 (COMPARATIVE)

Example 1 was followed, but no thermoplastic was added To prevent excessive loss of resin during cure, 0.15 parts triphenylphosphine catalyst was added. This resin system is also denominated herein as resin system A.

EXAMPLE 3 (COMPARATIVE)

Example 1 was followed, but the soluble polyimide thermoplastic P84 was replaced by soluble polyimide thermoplastic Matrimide®°5218, a product of Ciba-Geigy, which is a polyimide containing the residues of BTDA and 5(6)-amino-1-(4'-aminophenyl)-1,3,3-trimethylindane in the repeating unit.

EXAMPLE 4 (COMPARATIVE)

Example 1 was repeated with a Mitsui TPI thermoplastic polyimide, instead of P84 polyimide.

EXAMPLE 5 (COMPARATIVE)

Example 1 was repeated but HTA polysulfone, an amorphous polysulfone polymer from ICI was used instead of P84 polyimide.

EXAMPLE 6 (COMPARATIVE)

An improved, proprietary resin system was prepared which was similar to that of Example 2, but which has greater inherent toughness (without thermoplastic particles). This resin system is also designated in Table II as resin system B.

EXAMPLE 7

Example 1 was followed, but the bismaleimide resin system components, but for the thermoplastic, were similar to those of Example 6 (resin system B).

Prepregs were made from the preceding resin compositions on unidirectional IM-7 carbon fibers (Hercules) at 33±3% resin content and an areal fiber weight of 145±5 g/m² by single or dual filming as indicated below. The prepregs were then layed up into a [+45/0/−45/90]4s quasiisotropic laminate and cured at 180° C. for 6 hours in a vacuum bag (standard technique) in an autoclave at 85 psi pressure followed by a post cure for 3 hours at 232° C. at 85 psi. The cured laminates were tested for impact toughness in accordance with Boeing standard BSS 7260. The compression after being impacted at 1000 in-lb per inch thickness (4.45 kJ/m) are given in the table below.

TABLE I

| Trial | Resin (Example) | Thermoplastic | CAI[a] |
|---|---|---|---|
| 8 (Comparative) | A (2) | None | 193 |
| 9 (Comparative) | A (3) | Matrimide ® 5218 | 214 |
| 10 (Comparative) | A (4) | LARC TPI | 103 |
| 11 (Comparative) | A (5) | HTA polysulfone | 179 |
| 12 (Sub. Inv.) | A (1) | P84 | 262 |
| 13 (Sub. Inv.) | A (1) | P84 | 303[b] |

[a]Compressive strength in MPa after impact at 1000 in-lb/in (4.45 kJ/m).
[b]Dual filming, otherwise same as trial 12.

TABLE II

| Trial | Resin | Thermoplastic | CAI[a] |
|---|---|---|---|
| 8 (Comparative) | A | No | 193 |
| 12 | A | Yes | 262 |
| 13 | A[c] | Yes | 303 |
| 14 (Comparative) | B[b] | No | 248 |
| 15 | B[b,c] | Yes | 289 |

[a]CAI in MPa after 1000 in-lb/in (4.45 kJ/m) impact.
[b]Examples 14 and 15 contain resin systems from Examples 6 and 7, respectively.
[c]Dual filming.

The results of testing composites prepared from the various resin systems which are summarized in Table I indicate that the use of the subject invention thermoplastic polyimide particle-containing resin systems (Trials 12 and 13) provide a dramatic increase in toughness over the unmodified resin (Trial 8). Table I further shows that other commercially available, soluble, thermoplastic polyimides provide only marginal increases in toughness (Trial 9) or a severe decrease in toughness (Trial 10). Thus it is a requirement that the subject invention resin systems contain the claimed polyimides.

Table II shows further the dramatic increase in toughness possible, particularly when dual filming is used as in Trials 13 and 15. Table II also shows that when a base resin system of substantially greater inherent toughness is utilized, the ultimate toughness (Trial 15) is about the same as when a less inherently tough system is used as the base resin (Trial 13). This is important, as the base resin may then be selected not so much for its inherent toughness but for other properties such as tack, processability, ease of manufacture, cost of raw materials, etc.

The embodiments of the invention in which an exclusive privilege or property is claimed are defined as follows:

1. A heat-curable bismaleimide resin system suitable for preparing fiber reinforced prepregs by the film impregnation technique, comprising
   a. a heat-curable bismaleimide monomer;
   b. a comonomer selected from the group consisting of alkenylphenol or alkenylphenoxy group-containing comonomers and diamine comonomers;
   c. from 10 to about 60 weight percent based on the total of components a, b,, and c, of a soluble thermoplastic polyimide in substantially particulate form having particle sizes of from 2 μm to about 30 μm, said polyimide being characterized by having
      i. a majority of dianhydride residues corresponding to the residue of a dianhydride having the formula:

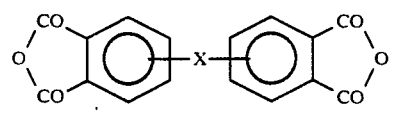

wherein X is selected from the group consisting of a covalent bond, —CR$_2$—, —CO—, —O—CO—, —O—CO—O—, —NH—CO—, —S—, —SO—, —SO$_2$—, wherein R is phenyl, C$_6$-C$_{10}$ cycloalkyl, or C$_1$-C$_4$ alkyl; and ii. at least 80 weight percent of the diamine residues corresponding to the residues of TDA and MDA.

2. The resin system of claim 1 wherein said polyimide is present in an amount of from 15 to about 40 percent by weight and wherein substantially all of the dianhydride residues correspond to those derived from BTDA and substantially all the diamine residues correspond to those derived from TDA and MDA.

3. The resin system of claim 2 wherein said component b is selected from the group consisting of alkenylphenol and alkenylphenoxy group-containing compounds present in an amount of from 5 to about 150 percent by weight relative to the weight of the bismaleimide monomer(s).

4. The resin system of claim 3 wherein said alkenyl group is selected from the group consisting of allyl, methallyl, and propenyl, and wherein said alkenylphenol or alkenylphenoxy group-containing compound is present in an amount of from 30 to about 100 percent by weight relative to the weight of the bismaleimide monomer(s).

5. The resin system of claim 4 wherein said alkenylphenol is selected from the group consisting of the o,o'-diallylbisphenols and the o,o'-dipropenylbisphenols, 6. The resin system of claim 5 wherein said alkenylphenol is o,o'-diallylbisphenol A and said polyimide is a polyimide having BTDA, TDA, and MDA residues and having a glass transition temperature by DSC of greater than 300° C., and having a particle size of from 2-20 μm.

* * * * *